Patented Sept. 30, 1930

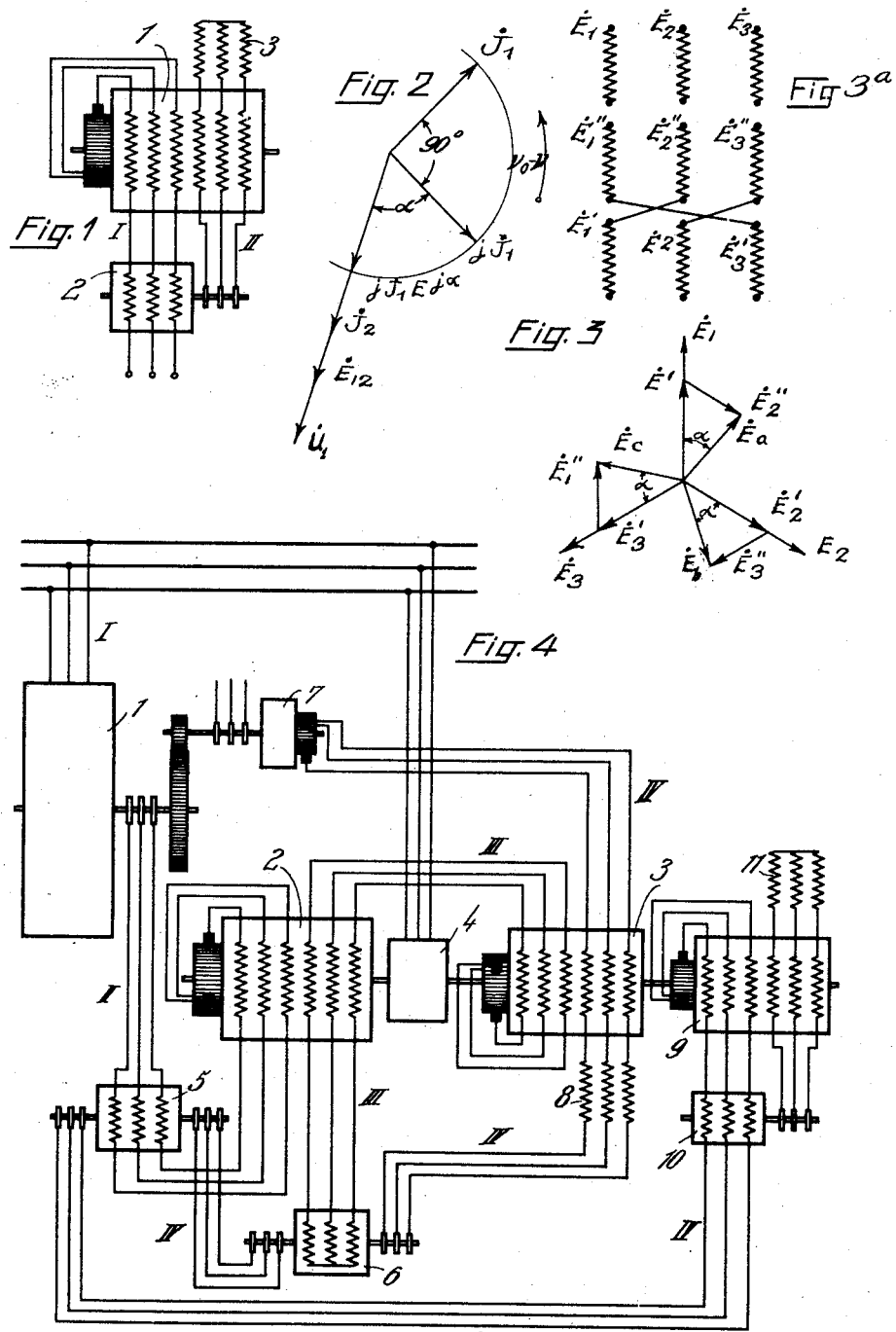

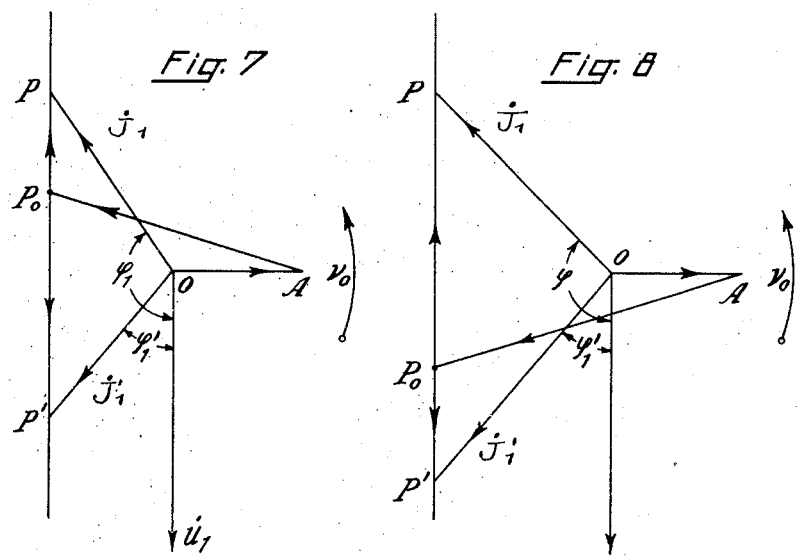
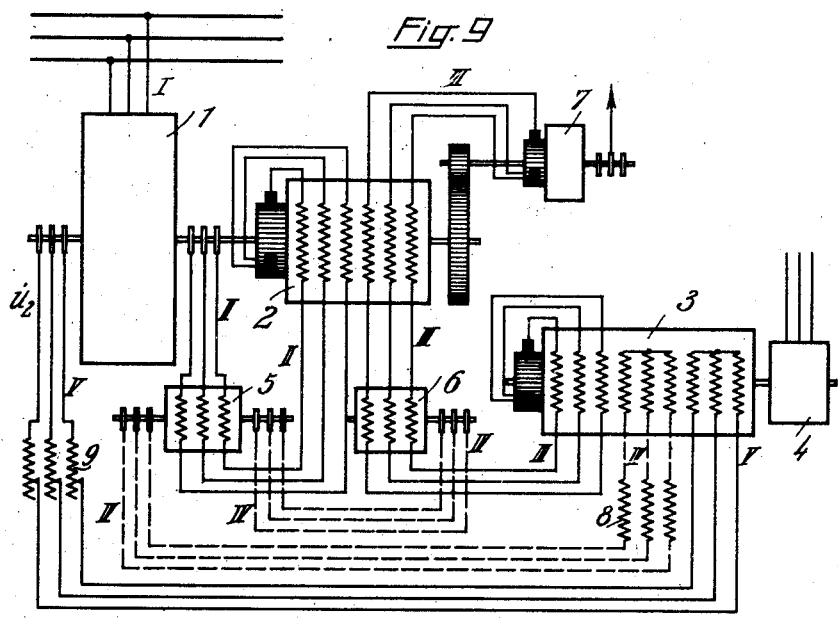

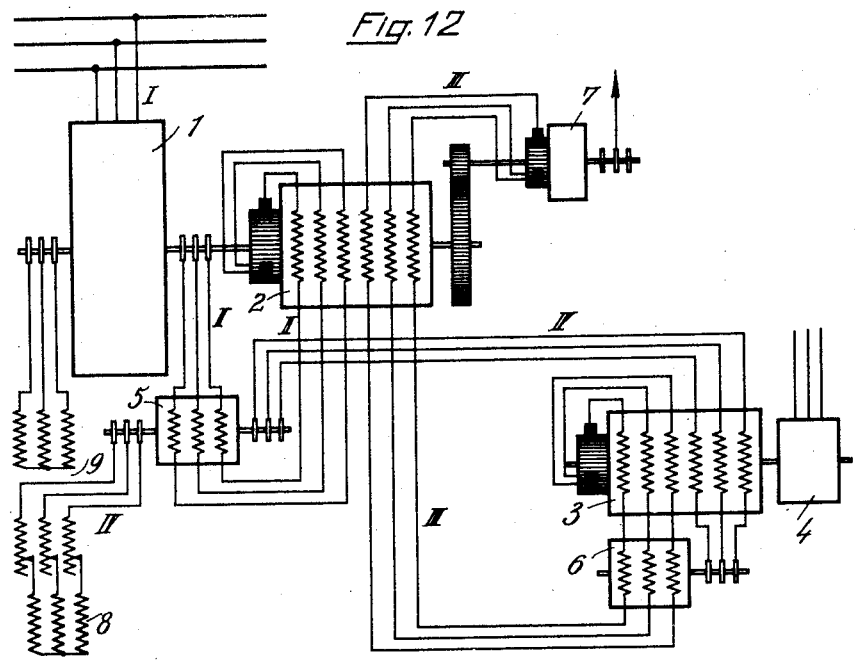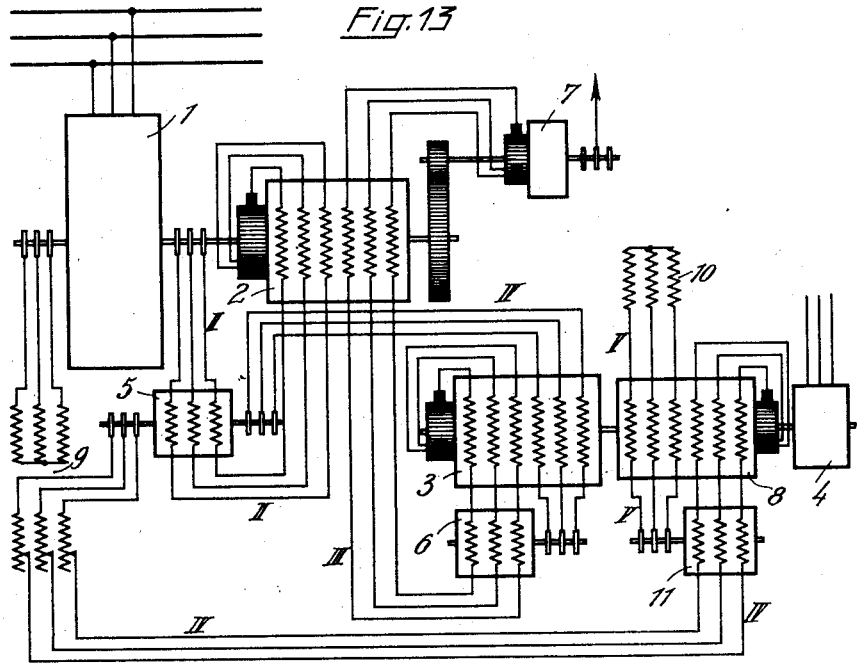

1,777,211

UNITED STATES PATENT OFFICE

JOHANN OSSANNA AND HANS GRANER, OF MUNICH, AND FRITZ HOFMANN, OF MUNICH-TALKIRCHEN, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

ARRANGEMENT AND METHOD FOR REGULATING ASYNCHRONOUS MACHINES

Application filed February 9, 1928, Serial No. 253,117, and in Germany February 14, 1927.

Our invention relates to a system for generating voltages of any desired magnitude and phase in circuits carrying alternating current of variable frequency.

In regulating asynchronous machines by means of commutator rear machines the task frequently arises to compensate the wattless resistance of windings which carry alternating current of variable frequency, as already described in our prior American application for patent Serial No. 242,198 of December 12, 1927. According to the said application a commutator machine driven with constant or substantially constant speed and a substantially non-reactive transformer, the secondary winding of which feeds the exciter winding of the commutator machine are employed for the purpose. This arrangement may, however, also serve to generate a voltage which does not simply stand at right angles to the primary current, but encloses with it any desired angle.

The present invention refers to an arrangement and method for regulating the speed or also the phase compensation of asynchronous machines by means of so-called commutator rear machines, which are connected in cascade with the asynchronous machine.

The invention relates in particular to such regulating systems and arrangements in which a load current is produced in the asynchronous machine which is independent of the slip, by introducing into the secondary circuit of the asynchronous machine and by way of the commutator machine two voltages, of which one neutralizes the secondary voltage of the asynchronous machine for each slip frequency, whereas the second voltage is independent of the slip and produces the load current.

The essential novel feature of the invention comprises a current transformer (in particular a variable phase transformer) which is connected with its primary winding into the secondary circuit of the asynchronous machine, while its secondary winding supplies the exciter winding of the commutator rear machine. This transformer is dimensioned in size and adjusted in phase such that the voltage, introduced into the secondary circuit of the asynchronous machine by way of the commutator machine, neutralizes the induced stray voltage produced in the secondary circuit of the asynchronous machine by the load current. By these means the undesired influence of this stray voltage induction upon the regulation is removed, which is particularly of great importance in asynchronous machines of the type characterized, which should have an output independent of the slip.

Our invention is illustrated in the accompanying drawings in which—

Figure 1 shows a portion of the total wiring arrangement comprising our invention, this portion illustrating the current transformer and the commutator rear machine connected according to the present invention, thereby illustrating the general principle involved;

Figure 2 represents a vector diagram of the voltages and currents produced by the current transformer and introduced into the commutator machine;

Figure 3 represents a vector diagram of the currents and voltages existing in the multi-phase current transformer;

Figure 5:
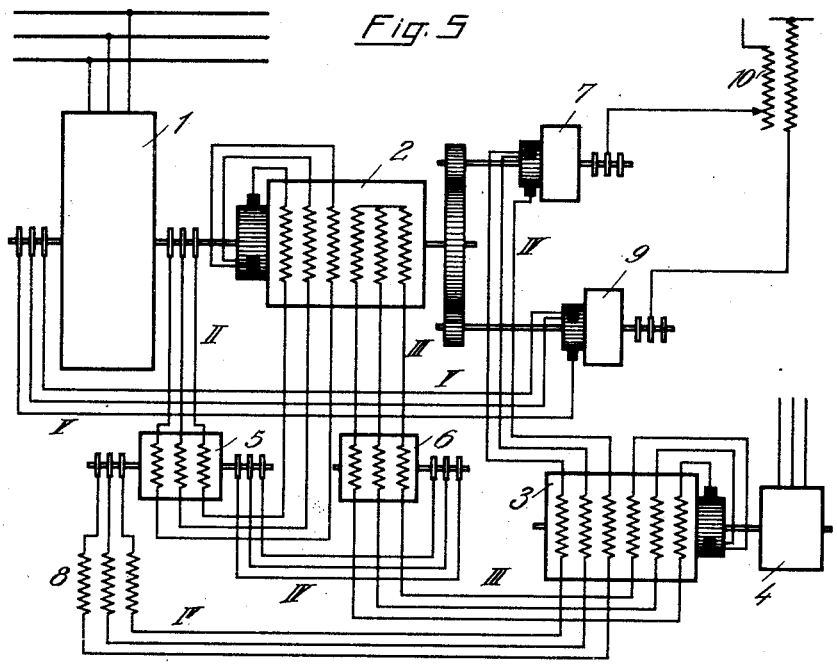
Figure 6:
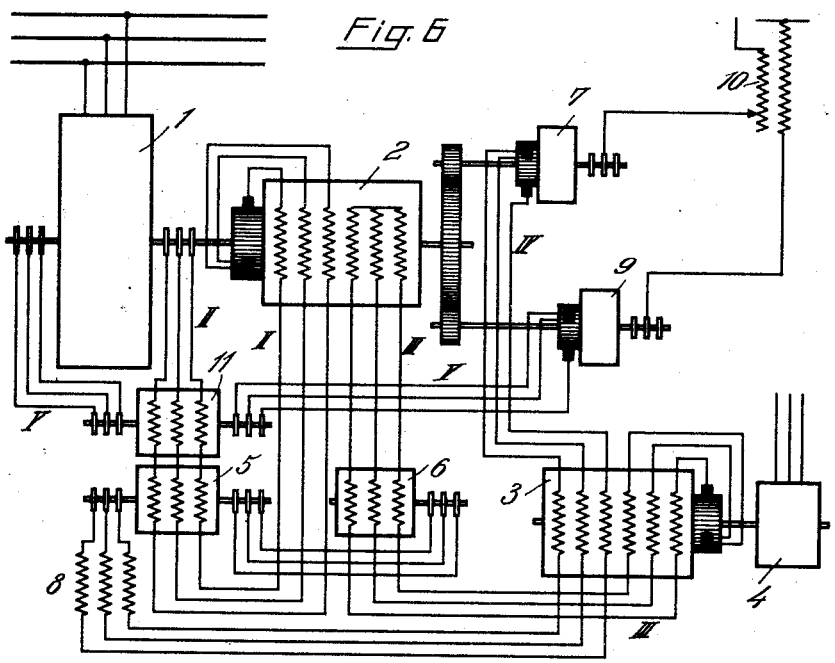

Figure 3ª represents the wiring arrangement of the primary and secondary windings of the current transformer pertaining to the vector diagram, Figure 3;

Figures 4, 5 and 6 each represent complete modified wiring diagrams of the system according to our invention;

Figures 7 and 8 represent vector diagrams of the currents and voltages in the asynchronous machine, and Figures 9, 10, 11, 12 and 13 represent further modifications of the complete wiring diagrams according to the present invention.

Referring to Figures 1 and 2, the commutator machine 1 and the primary winding of the practically non-reactive transformer 2 are traversed by the current $J_1$ of the frequency $\nu_0 - \nu = s.\nu_0$. $\nu_0$ denotes in this case the frequency of the net voltage supplied to the asynchronous machine; with this frequency corresponds the synchronous rotary speed of the primary flux of the asynchronous machine. $\nu$ on the other hand denotes the frequency to which corresponds the speed of the rotor of the asynchronous machine, and $s$ represents the slip of the asynchronous machine in per cent. In the secondary winding of the transformer 2 a voltage $\dot{E}_{12}$ of the alternating induction is induced which lags behind the current $\dot{J}_1$ by 90° and thus assumes a phase relation indicated by the vector $j.\dot{J}_1$ in Fig. 2 of the drawings, provided the windings of the transformer are coaxial to one another. If, however, the secondary winding is turned through the angle $\alpha$ in relation to the primary one, which is possible in the case of a booster transformer, the voltage $\dot{E}_{12}$ of the alternating induction will enclose the angle $\alpha$ with the vector $j.\dot{J}_1$. In Fig. 2 it is assumed that the voltage $\dot{E}_{12}$ lags behind the vector $j.\dot{J}_1$ by the angle $\alpha$. Equal in phase or at least approximately equal in phase with the voltage $\dot{E}_{12}$ is the exciter current $\dot{J}_2$ of the commutator machine 1, provided the ohmic resistance 3 in the circuit II is high in relation to the wattless resistance. The voltage $\dot{U}_1$ generated in the commutator machine is ultimately either equal in phase with the exciter current $\dot{J}_2$ or encloses with it an angle of 180°. It is thus possible to generate by means of the arrangement mentioned a voltage $\dot{U}_1$ which with respect to the current $\dot{J}_1$ encloses any desired angle (in Fig. 2 $(90+\alpha)°$). For the voltage $\dot{E}_{12}$ the vector equation $$\dot{E}_{12} = j.s\ k_{12}.\dot{J}_1.\epsilon^{j\alpha} \quad 1$$

holds good when $k_{12}$ denotes the wattless resistance of the alternating induction at the frequency $\nu_0$, $s$ the slip and $\epsilon^{j\alpha} = \cos\alpha + j\sin\alpha$.

The desired phase displacement between the current $\dot{J}_1$ and the voltage $\dot{E}_{12}$ may best be attained by the aid of a booster transformer.

This type of transformer consists usually of a rotary transformer built like an asynchronous machine in which the rotor does not continuously rotate, but is merely shifted into the desired angular relation to the stator by any suitable outside means.

It is, however, also possible to set any desired angle between the current $\dot{J}_1$ and the voltage $\dot{E}_{12}$ by the aid of a static transformer. It is merely necessary to divide the secondary winding into two or more portions and to connect them in suitable manner. In the primary winding are induced the three self-induction voltages $\dot{E}_1$, $\dot{E}_2$ and $\dot{E}_3$, which enclose with one another an angle of 120°. In the secondary winding, on the other hand, six voltages are developed ($\dot{E}_1'$, $\dot{E}_2'$, $\dot{E}_3'$, $\dot{E}_1''$, $\dot{E}_2''$ and $\dot{E}_3''$), if this winding consists of two parts. The voltages $\dot{E}_1$, $\dot{E}_1'$ and $\dot{E}_1''$ are of equal phase. The resulting secondary voltages are indicated in the system of connection illustrated in the vector diagram Figure 3 and in the pertaining wiring diagram Figure 3ª by $$\dot{E}_a = \dot{E}_1' + \dot{E}_2''; \dot{E}_b = \dot{E}_2' + \dot{E}_3''; \dot{E}_c = \dot{E}_3' + \dot{E}_1'' \quad 2$$

The vectors enclose with the primary voltages the angle $\alpha$. By means of a static transformer any desired phase displacement $\alpha$ may thus be adjusted; the only difference is that a change of the angle $\alpha$, if necessary, is not so easily carried out as with the booster transformer.

If the frequency $\nu_0 - \nu$ of the current passes through zero into the negative, if thus $\nu$ becomes larger than $\nu_0$, the direction of rotation of the rotating field in the booster transformer changes, so that the voltage $\dot{E}_{12}$ does no longer lag behind the current $\dot{J}_1$ by $(90+\alpha)°$, but by $(90-\alpha)°$. If a variation of the angle is not practicable when exceeding synchronism, it is necessary, for oversynchronism, to bring the booster transformer 2 into a different position. This may be effected automatically, as fully explained in our above mentioned patent application. When an ordinary static transformer is employed, however, a change in the connections becomes necessary for oversynchronism. Only in the specific case in which the angle $\alpha$ is zero, a change in the connections is not necessary. By the aid of the system of connections shown in Fig. 1 with all its varieties according to our application Serial No. 242,198 a voltage may be generated, which encloses with the current not only an angle of 90° but any other desired angle.

It is furthermore possible to let the secondary windings of any number of transformers act upon the exciter winding of one and the same commutator machine and thus to generate different voltages in the said commutator machine which are in a definite ratio, regarding magnitude and phase, to the primary currents of the transformers. For this purpose all the secondary windings of the substantially non-reactive transformers are connected in the exciter circuit of the said commutator machine. This is illustrated in Fig. 4 of the drawings. The slip output machine 2, as well as the exciter machine 3 of the said machine 2 are driven by a motor 4 of constant or substantially constant speed. In the circuit II is connected the primary winding of the transformer 5 in the circuit III the primary winding of the transformer 6. The secondary windings of the transformers 5 and 6 work on the circuit IV fed by the frequency converter 7. It is then nceessary to render the circuit IV non-inductive in any suitable manner, so that proportionality exists between the voltages mentioned and the current $\dot{J}_4$. This may be effected by connecting in circuit a non-inductive resistance 8 of suitable value. This method has, however, the disadvantage of leading to high capacities of the transformers 5 and 6 and the frequency converter 7. Instead of increasing the ohmic resistance the inductivity of the circuit IV may preferably be removed. This may be effected by providing a compensated machine 9, a transformer 10 and a non-inductive resistance 11 i. e. according to the method of our said prior application for patent.

In the circuit IV of Fig. 4 three voltages are operative. First the voltage $\dot{U}_0$ of the frequency converter and then the two secondary voltages of the transformers 5 and 6, namely $$\left.\begin{array}{l} \dot{U}_{34} = j\,s\,k_{34}.\dot{J}_3.\epsilon^{j\beta} \\ \dot{U}_{24} = j\,s\,k_{24}.\dot{J}_2.\epsilon^{j\alpha} \end{array}\right\} \quad 3$$

For the exciter current $\dot{J}_4$ we then obtain under the assumption that the circuit IV has been rendered non-inductive, the equation $$r_4.\dot{J}_4 = \dot{U}_0 + \dot{U}_{34} + \dot{U}_{24} \quad 4$$

in which $r_4$ represents the ohmic resistance of circuit IV. Proportional to the current $\dot{J}_4$ is the voltage $\dot{U}_3$ of the commutator machine 3, so that we may write $$\dot{U}_3 = c_{43}.\dot{J}_4 = \frac{c_{43}}{r_4}(\dot{U}_0 + \dot{U}_{24} + \dot{U}_{34}) \quad 5$$

In this equation $c_{43}$ represents a constant, determined by the dimensions of the commutator machine 3 by which constant the ratio between the voltage induced in the commutator machine 3 and its exciter current are determined. On the other hand we have $$\dot{U}_3 = \dot{J}_3.(r_3 - jsk_3) \quad 6$$

if with $sk_3$ is denoted the resulting wattless resistance of the circuit III at the slip frequency and $r_3$ represents the ohmic resistance of this circuit. From this follows $$\dot{J}_3(r_3 - jsk_3) = \frac{c_{43}}{r_4}(\dot{U}_0 + \dot{U}_{24} + jsk_{34}.\dot{J}_3.\epsilon^{j\beta}) \quad 7$$

If we now make $$\beta = 180° \text{ and } k_{34} = k_3.\frac{r_4}{c_{43}} \quad 8$$

we obtain $$\dot{J}_3 = \frac{c_{43}}{r_3.r_4}.(\dot{U}_0 + \dot{U}_{24}) \quad 9$$

The voltage $\dot{U}_2$ of the slip output machine is proportional to the exciter current $\dot{J}_3$. We thus obtain $$\dot{U}_2 = c_{32}.\dot{J}_3 \quad 10$$

or if we introduce for $\dot{J}_3$ and $\dot{U}_{24}$ the values from Equation 9 (or 3)

$$\dot{U}_2 = \frac{c_{32}.c_{43}}{r_3.r_4}.[\dot{U}_0 + jsk_{24}.\dot{J}_2.\epsilon^{j\alpha}] \quad 11$$

In the foregoing equation $c_{32}$ denotes a constant which, the same as the aforementioned constant $c_{43}$, is determined by the dimensions of the machine which furnishes the slip energy.

On the other hand it can be proven that between the no load voltage $\dot{E}_{20}$ (voltage in the inoperative state and with the rotor winding open) of the asynchronous machine, the slip $s$, the ohmic resistance $r_1$ and $r_2$ and the wattless resistances of the leakage $k\sigma_1$ and $k\sigma_2$ of the windings I and II the equation exists $$s.\dot{E}_{20} - \dot{U}_2 = \dot{J}_2\left[r_2 + s\frac{r_1}{1+\sigma_1}\left(\frac{w_2 f_2}{w_1 f_1}\right)^2 - js\left\{k\sigma_2 + \frac{k\sigma_1}{1+\sigma_1}.\left(\frac{w_2 f_2}{w_1 f_1}\right)^2\right\}\right] \quad 12$$

In this equation $\sigma_1$ denotes the primary leakage coefficient and $\frac{w_2 f_2}{w_1 f_1}$ the ratio of the windings. By introducing the value $\dot{U}_2$ from Equation 11 into this equation, we get $$s.\dot{E}_{20} - \frac{c_{32}.c_{43}}{r_3.r_4}.[\dot{U}_0 + jsk_{24}.\dot{J}_2(\cos\alpha + j\sin\alpha)] =$$
$$\dot{J}_2.\left[r_2 + s\frac{r_1}{1+\sigma_1}.\left(\frac{w_2 f_2}{w_1 f_1}\right)^2 - js\left\{k\sigma_2 + \frac{k\sigma_1}{1+\sigma_1}\left(\frac{w_2 f_2}{w_1 f_1}\right)^2\right\}\right] \quad 13$$

or also $$s.\dot{E}_{20} - \frac{c_{32}.c_{43}}{r_3.r_4}.\dot{U}_0 = r_2.\dot{J}_2 \quad 14$$

if $k_{24}$ and $\alpha$ are so chosen that the two equations $$k_{24}.\cos\alpha = \left[k\sigma_2 + \frac{k\sigma_1}{1+\sigma_1}.\left(\frac{w_2 f_2}{w_1 f_1}\right)^2\right].\frac{r_3.r_4}{c_{32}.c_{43}}$$
$$k_{24}.\sin\alpha = \frac{r_1}{1+\sigma_1}.\left(\frac{w_2 f_2}{w_1 f_1}\right)^2.\frac{r_3.r_4}{c_{32}.c_{43}} \quad 15$$

are complied with.

This proves that by providing two substantially non-reactive transformers, the primary windings of which are connected in the circuits II and III of Fig. 4 and the secondary windings of which work on the circuit IV, it is, for example, possible to obtain for the secondary current $\dot{J}_2$ the simple relation of the Equation 14.

If now the secondary current $\dot{J}_2$ changes in dependence of the slip and $\dot{U}_0$ according to the Equation 14, it can be proven, as will be done further on, that the effective output of the asynchronous machine changes proportional to the slip, while the wattless output is practically independent of the slip. As under certain circumstances it may be desirable that the effective output changes to a lesser degree, or not at all, with the slip, it will first be shown how this may be attained. We shall then have an opportunity to show the application of the present invention by further examples.

In order to reduce the dependence of the effective output from the slip or to do away with it altogether, we are compelled to introduce into the circuit II besides the voltages $s.\dot{E}_{20}$ and $$\frac{c_{32}.c_{43}}{r_3.r_4}.\dot{U}_0$$

indirectly or directly a third voltage, which is proportional to $s.\dot{E}_{20}$.

Such a voltage may be obtained by providing an asynchronous machine, which is driven from the main machine either directly or through a gearing, and the primary winding of which is connected to the network voltage $\dot{U}_1$. From the secondary winding of this machine may be taken a voltage which is proportional to the slip. This arrangement has the disadvantage that it requires a comparatively large auxiliary machine. Therefore preferably a second winding is provided in the rotor of the main machine from which an auxiliary voltage $\dot{U}b$ can be derived which is determined by the equation $$\frac{w_2.f_2}{w_1.f_1}.\dot{U}b = \dot{U}_2 + \dot{J}_2.(r_2 - jsk'\sigma_2) \quad 16$$

when by $k\sigma_2$ is understood a certain portion of the secondary wattless resistance of the leakage, so that $$k\sigma_2 = k'\sigma_2 + k''\sigma_2 \quad 17$$

If from Equations 12 and 16 $\dot{U}_2$ is eliminated, then we have $$\frac{w_2.f_2}{wb.fb}.\dot{U}b = s.\dot{E}_{20} - \dot{J}_2 s\left[\frac{r_1}{1+\sigma_1}\left(\frac{w_2.f_2}{w_1.f_1}\right)^2 - j\left\{k''\sigma_2 + \frac{k\sigma_1}{1+\sigma_1}\left(\frac{w_2.f_2}{w_1.f_2}\right)^2\right\}\right] \quad 18$$

The auxiliary winding and the main winding in the rotor are assumed to be coaxial.

In Fig. 5 of the drawings the first method is illustrated, how the auxiliary voltage $\dot{U}b$ can be introduced into the circuit. $\dot{U}b$ is first brought to the network frequency $\nu_0$ by a periodicity converter 9 to be then introduced into the circuit of the frequency converter 7 by a transformer 10. Since otherwise the system of connections of Fig. 5 is identical with that according to Fig. 4, not taking into account that the slip output machine is now directly coupled with the main machine 1, it is obvious that the results obtained up to now can also be transmitted to the system of connections of Fig. 5 by introducing into the Equation 14 in the place of $\dot{U}_0$ the new voltage $$\dot{U}_0 + \mu.\dot{U}b \quad 19$$

In this $\mu$ takes into account the ratio of transmission of the transformer 10. Instead of Equation 14, we thus get the equation $$s.\dot{E}_{20} - \frac{c_{32}.c_{43}}{r_3.r_4}.(\dot{U}_0 + \mu\dot{U}b) = r_2.\dot{J}_2 \quad 20$$

the fact that the slip output machine 2 possesses no longer a constant speed being neglected. If we now imagine the value $\dot{U}b$ obtained from Equation 18 introduced into Equation 20 we see, that the desired proportionality between the current $\dot{J}_2$ and the resulting voltage in the circuit II is lost again. The auxiliary voltage $\dot{U}b$ is thus not accurately the voltage which leads towards the desired aim.

It is, however, possible to render the voltage, with which the frequency converter 9 is fed, independent of current $\dot{J}_2$, by introducing a further voltage in the circuit V of Fig. 5. It is merely necessary to provide a further transformer 11 the primary winding of which is traversed by the current $\dot{J}_2$ and the secondary winding of which is connected in the circuit V, in order to attain the desired aim. This has been done in Fig. 6. Otherwise this figure illustrates exactly the same system of connection as the Fig. 5 of the drawings.

The secondary voltage of the transformer 11 is $$\dot{U}_{25} = jsk_{25}.\dot{J}_2.\epsilon^{j\alpha} \quad 21$$

The resulting voltage with which the frequency converter is fed thus is $$\dot{U}b + \dot{U}_{25} = \frac{wb.fb}{w_2.f_2}\left[s\dot{E}_{20} - \dot{J}_2.s\left\{\frac{r}{1+\sigma_1}\left(\frac{w_2.f_2}{w_1.f_1}\right)^2 - j\left(k''\sigma_2 + \frac{k\sigma_1}{1+\sigma_1}\left(\frac{w_2.f_2}{w_1.f_1}\right)^2\right)\right\}\right]$$
$$+ js\dot{J}_2.k_{25}(\cos\gamma + j.\sin\gamma) \quad 22$$

Making now $$k_{25}.\sin\gamma = -\frac{r}{1+\sigma_1}.\left(\frac{w_2.f_2}{w_1.f_1}\right)^2.\frac{wb.fb}{w_2.f_2}$$

and $$k_{25}.\cos\gamma = +\left[k\sigma_2 + \frac{k\sigma_1}{1+\sigma_1}\left(\frac{w_2.f_2}{w_1.f_1}\right)^2\right]\frac{wb.f}{w_2.f_2} \quad 23$$

then we have*

$$\dot{U}b + \dot{U}_{25} = \frac{wb.fb}{w_2.f_2}.s\dot{E}_{20} \quad 24$$

If the other transformers 5 and 6 are chosen as stated hereinbefore, we get instead of Equation 14 or 20 the equation $$s.E_{20} - \frac{c_{32}.c_{43}}{r_3.r_4}[\dot{U}_0 + \mu(\dot{U}b + \dot{U}_{25})] = r_2.\dot{J}_2 \quad 25$$

or with the values from Equation 24

$$s.\dot{E}_{20}\left[1 - \frac{c_{32}.c_{43}}{r_3.r_4}.\mu.\frac{wb.fb}{w_2.f_2}\right] - \frac{c_{32}.c_{43}}{r_3.r_4}.\dot{U}_0 = r_2.\dot{J}_2 \quad 26$$

or simpler $$s.\dot{E}_{20}.(1-\mu_1) - \mu_2\dot{U}_0 = r_2.\dot{J}_2 \quad 27$$

if we put $$\mu_1 = \frac{c_{32}.c_{43}}{r_3.r_4}.\mu.\frac{wb.fb}{w_2.f_2}$$

and $$\mu_2 = \frac{c_{32}.c_{43}}{r_3.r_4} \quad 28$$

---

* If main and auxiliary winding in the rotor enclose between them and the angle $\delta$ then we can make $$\dot{U}b + \dot{U}_{25} = \frac{wb.fb}{w_2.f_2}.s.E_{20}.\epsilon^{j\delta} \quad 24^a$$

so that instead of Equation 27 we obtain the equation $$s.E_{20}[1-\mu\cos\delta - j\mu\sin\delta] - \mu_2.\dot{U}_0 = r_2.\dot{J}_2 \quad 27^a$$

From this it follows that the wattless output may be made variable with $s$.

The Equation 27 differs from Equation 14 by the factor $1-\mu_1$ following $s.\dot{E}_{20}$. By a suitable choice of $\mu$, and thus the ratio of transmission of the transformer 10, it is possible to make the influence of $s.\dot{E}_{20}$ and $\dot{J}_2$ as great or small as desired. At $\mu=1$ the equation member which contains the factor $s.E_{20}$, disappears so that $J_2$ is entirely independent of the slip.

At this place it may be pointed out that the arrangement of the transformer 11 is not at all necessary in the wiring diagram of Fig. 6 to attain the aim sought. It is also possible to get along with the diagram of connections of Fig. 5 by dimensioning the transformer 5 otherwise than stated.

After the application of our invention has been demonstrated above with reference to a few examples, it will now be proven that by the provisions made it is possible to regulate at will the exchange of the effective output and the wattless output of the asynchronous machine with the network. For the primary terminal voltage $\dot{U}_1$ the equation holds good $$U_1 = -J_1(r_1-jk_1)+jk_{21}.J_2 \quad 29$$

or if for the current $J_2$ the value from Equation 27 is introduced $$U_1 = -J_1(r_1-jk_1)+j\frac{k_{21}}{r_2}[sE_{20}(1-\mu_1)-\mu_2.U_0] \quad 30$$

If $r_1$ is neglected as small in comparison with $k_1$ (without this neglect a very similar result is obtained) then we get $$J_1 = -j\frac{U_1}{k_1}+\frac{k_{21}}{k_1}\left[\frac{s.E_{20}}{r_2}(1-\mu_1)-\mu_2\frac{U_0}{r_2}\right] \quad 31$$

If it is furthermore taken into account that $$\dot{E}_{20} = \frac{U_1}{1+\sigma_1} \cdot \frac{w_2 f_2}{w_1 f_1} \quad 32$$

it follows that $$J_1 = -j\frac{U_1}{k_1} - \frac{U_1}{r_2\left(\frac{w_1 f_1}{w_2 f_2}\right)^2} \cdot \frac{1-\mu_1}{1+\sigma_1}.s + \frac{U_0}{r_2} \cdot \frac{w_2 f_2}{w_1 f_1} \cdot \frac{\mu_2}{1+\sigma} \quad 33$$

This equation is graphically illustrated in Figs. 7 and 8. $J_1$ consists of three components. The first component $$\dot{OA} = -j\frac{U_1}{k_1} \quad 34$$

is leading by 90° in relation to the voltage $U_1$. It represents the magnetizing current of the asynchronous machine. The second component is $$\dot{AP} = \frac{U_0}{r_2} \cdot \frac{w_2 f_2}{w_1 f_1} \cdot \frac{\mu_2}{1+\sigma_1} \quad 35$$

It is proportional to the voltage $U_0$ and equal in phase with $U_0$, but independent of the slip. The third component is given by $$\dot{P_0P} = -\frac{U_1}{r_2\left(\frac{w_1 f_1}{w_2 f_2}\right)^2} \cdot \frac{1-\mu_1}{(1+\sigma_1)}.s \quad 36$$

At undersynchronism $(s>o)$ it is directed opposite to the $\dot{U}_1$. At oversynchronism it is in the same direction as $\dot{U}_1$. The end P of the primary current $J_1$ is thus located upon a line parallel to the $U_1$ direction through the point $P_0$. The proportionality factor between the slip and the component $\dot{P_0P}$ may be varied at will by choosing a proper value for $\mu_1$. At $\mu_1=0$ the change of $\dot{P_0P}$ with the slip is very great; at $\mu_1=1$ on the other hand $\dot{P_0P}$ is equal to zero, so that the effective component of $\dot{J}_1$ is perfectly independent of the slip. The wattless component of $\dot{J}_1$ is entirely independent of $s$. At synchronism (point $P_0$) we get according to the phase of $\dot{U}_0$ either motor action (Fig. 7) or generator action (Fig. 8) or a pure wattless current. The wattless current may be regulated at will by $\dot{U}_0$. At undersynchronism in the case of Fig. 7 the negative effective current taken absolutely becomes greater, i. e. the output of the machine running as motor grows. At oversynchronism the negative effective current first drops back to zero and then becomes positive (generator action). This also applies to the case illustrated in Fig. 8.

In a similar manner it could be attained (see footnote on page 4) that the wattless output varies proportional with the slip. To express it concisely, it is by the aid of our invention possible to impart to the asynchronous machine any desired characteristic, as regards the effective output as well as the wattless output.

Figure 10:
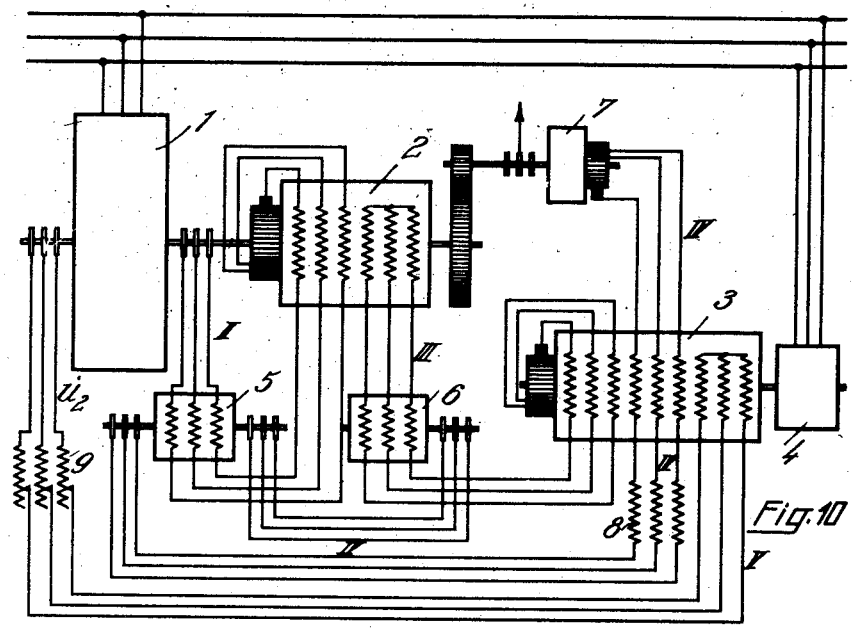

For the sake of completeness the application of our invention will be shown in cases in which the auxiliary voltage Ub is connected into the circuits in other ways. In Figs. 9 and 10 the auxiliary voltage is employed for the excitation of the compensated machine 3. The exciter current $\dot{J}_5$ originating from the auxiliary voltage is regulated by a resistance 9. In both cases the transformers 5 and 6 work upon the circuits IV. The frequency converter, which may be compensated or not compensated, is on the other hand in Fig. 9 connected in the circuit III and in Fig. 10 in the circuit IV.

Figure 11:
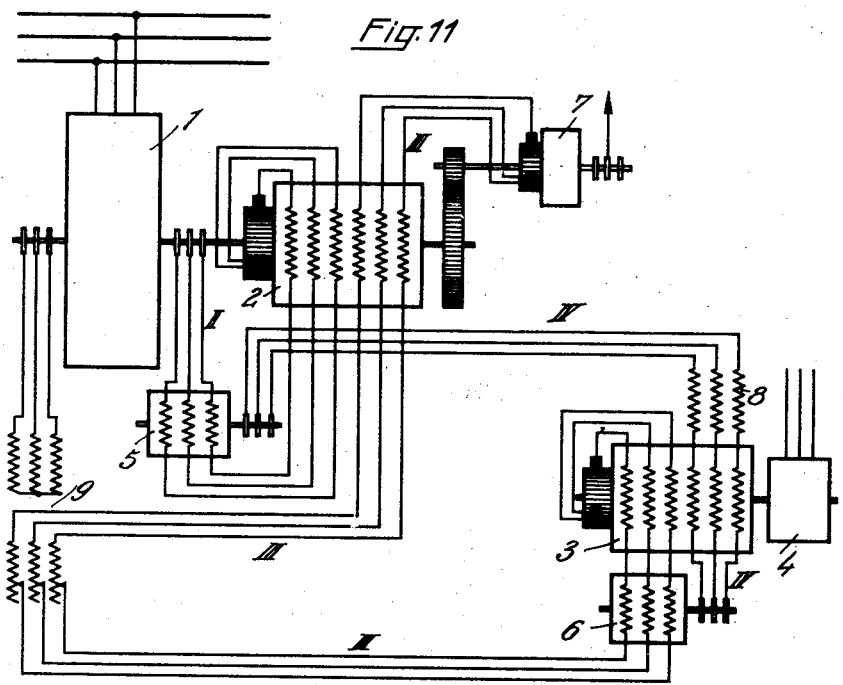

In the systems of connection according to the Figs. 11, 12 and 13 the auxiliary voltage is transformed by a transformer 9 the ratio of transformation of which is variable, and then connected either in the circuit III as in Fig. 11, or in the circuit IV, as in the Figs. 12 and 13. In Fig. 12 the circuit IV is made non-inductive by a resistance 8, while in Fig. 13 the non-inductivity of the circuit IV is attained by an arrangement according to our prior application for patent Serial No. 242,198. The wiring in Fig. 11 has the disadvantage that at synchronism the transformer 9 is traversed on the secondary side by direct current. This is avoided in the systems of connection according to Figs. 12 and 13.

In conclusion it may be pointed out that the practically non-reactive transformer could also be connected into the primary circuit in place of the secondary circuit of the asynchronous machine. It would then have to work on an asynchronous machine with the same slip frequency as the main machine and the voltage of this asynchronous machine would have to be introduced into any exciter circuit.

Various modifications and changes may be made without departing from the spirit and the scope of the invention, and we desire, therefore, that only such limitations shall be placed thereon as are imposed by the prior art.

We claim as our invention:

1. In combination an asynchronous machine, a commutator rear machine connected into the secondary circuit of said asynchronous machine, a current transformer connected with its primary winding into the secondary circuit of the asynchronous machine, means for energizing the exciter winding of said commutator machine by the secondary winding of said transformer, said transformer being dimensioned and adjusted in its phase so that its secondary winding introduces by way of the commutator machine into the secondary circuit of the asynchronous machine a voltage, which neutralizes in said secondary machine circuit the inductive stray voltage produced by the load current.

2. In combination an asynchronous machine, a commutator rear machine connected into the secondary circuit of said asynchronous machine, a rotary transformer connected with its primary winding into the secondary circuit of the asynchronous machine, means for energizing the exciter winding of said commutator machine by the secondary winding of said transformer, said rotary transformer being dimensioned and adjusted in its phase so that its secondary winding introduces by way of the commutator machine into the secondary circuit of the asynchronous machine a voltage, which neutralizes in said secondary machine circuit the inductive stray voltage produced by the load current.

3. In combination an asynchronous machine, a commutator rear machine connected in cascade with said asynchronous machine, means for producing in the commutator machine an exciter field, consisting of two components, of which one is dimensioned in size and phase so that its voltage, introduced by the commutator machine into the secondary circuit of the asynchronous machine, increases proportionate with the slip of said asynchronous machine and at least approximately neutralizes the secondary voltage of said latter machine, and the other component producing in the secondary circuit of said machine a load current which is independent of the slip, a current transformer having its primary winding connected in circuit with the secondary circuit of the asynchronous machine, means for feeding the exciter winding of the commutator machine by the secondary winding of said current transformer, said current transformer being proportioned in size and adjusted in phase so that its secondary voltage introduces by way of the commutator machine into the secondary circuit of the asynchronous machine a voltage, which neutralizes in said secondary circuit the inductive stray voltage produced by the load current.

4. Method of generating in asynchronous machines a load current independent of the slip, consisting in supplying to the secondary circuit of said machine a plurality of voltages, of which the first is dependent from the slip and for each slip equal and substantially opposite to the secondary voltage produced by the main field of the machine, the second voltage supplied being independent of the slip and producing the secondary load current of the machine, the third voltage supplied being equal but opposite to the stray voltage produced in the secondary machine circuit by the load current therein for neutralizing said stray voltage.

5. In combination an asynchronous machine, a commutator rear machine connected in cascade with said asynchronous machine and having an exciter winding in its stator and means for supplying a slip frequency voltage to said exciter winding, a current transformer having its primary winding connected in the secondary circuit of said asynchronous machine, means for applying to the exciter winding of said commutator machine the secondary voltage of said current transformer, said transformer being dimensioned in size and arranged in phase so that its voltage, applied to the secondary of said asynchronous machine by way of said commutator machine, neutralizes the secondary stray voltage of the asynchronous machine produced by the load current, and means adapted to neutralize the inductive voltage produced in the exciter winding of said commutator machine.

6. In combination an asynchronous machine, a commutator rear machine connected in cascade with said asynchronous machine and having an exciter winding in its stator, a frequency converter adapted to supply a voltage of prevailing slip frequency to said exciter winding and means for supplying net frequency to said converter, an auxiliary winding in the secondary portion of said asynchronous machine, means for applying the voltage produced in said auxiliary winding and the slip frequency voltage of said converter to the exciter winding of said commutator machine, a current transformer connected with its primary winding in the secondary circuit of said asynchronous machine, the voltage of the secondary transformer winding being applied to the exciter winding of said commutator machine, said current transformer being dimensioned in size and adjusted in phase so that its voltage, introduced into the secondary winding of the asynchronous machine by way of said commutator machine, neutralizes the stray voltage produced in the secondary winding of the asynchronous machine by the load current in said winding.

In testimony whereof we affix our signatures.

JOHANN OSSANNA.
HANS GRANER.
FRITZ HOFMANN.